Dec. 3, 1957    B. S. HARRINGTON    2,814,963
ARTICLE GRIPPING TOOL
Filed Dec. 22, 1955    2 Sheets-Sheet 1
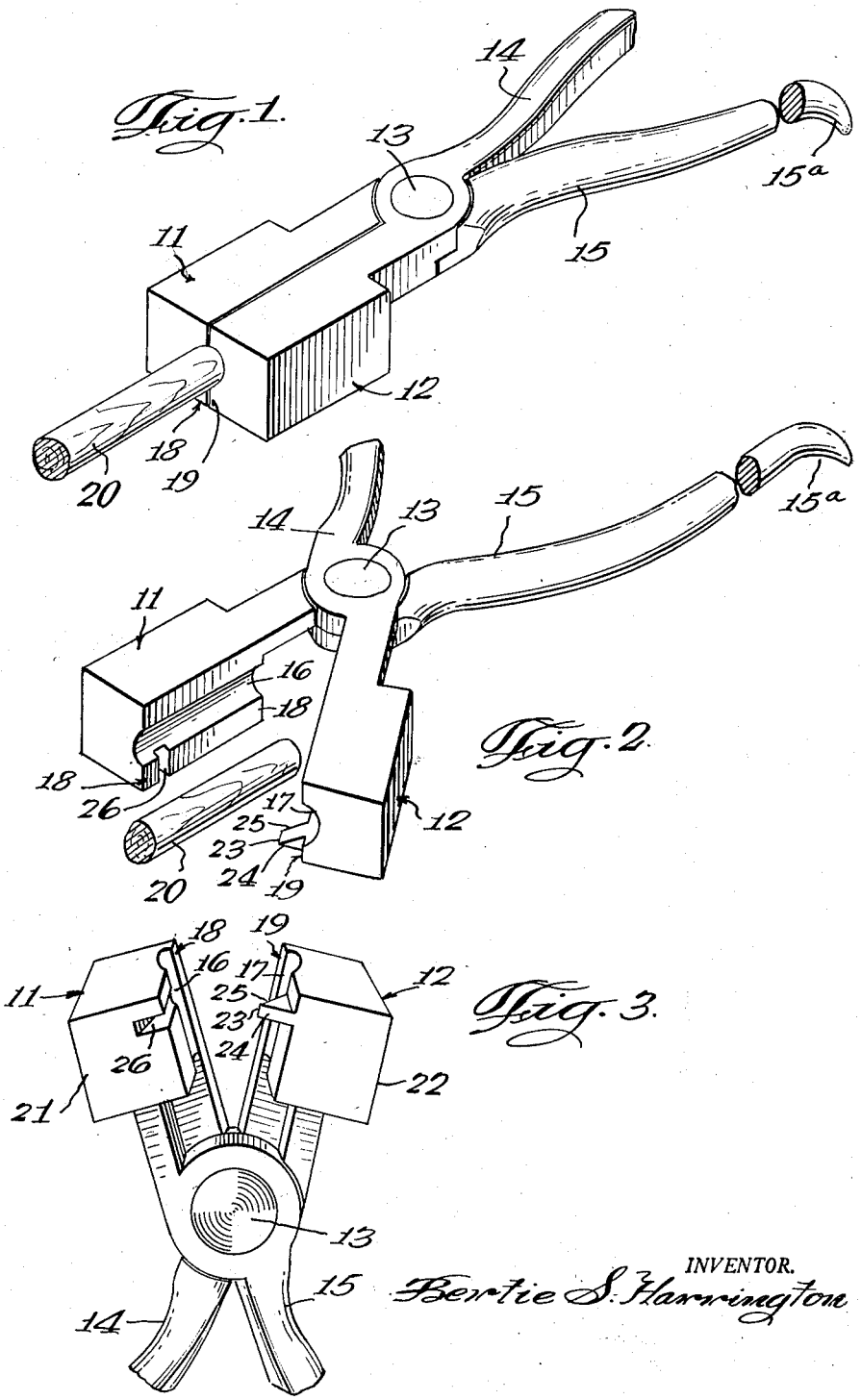
INVENTOR.
Bertie S. Harrington

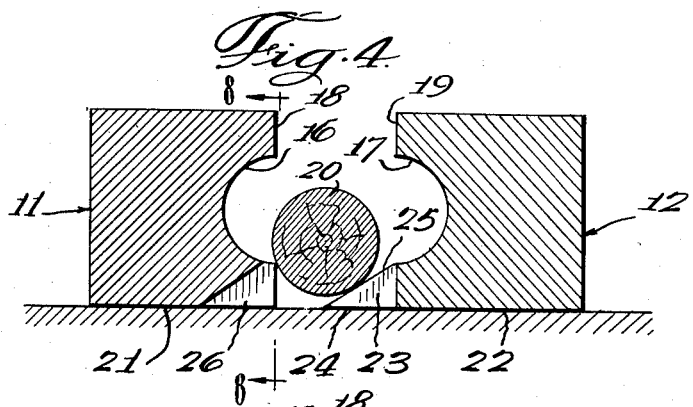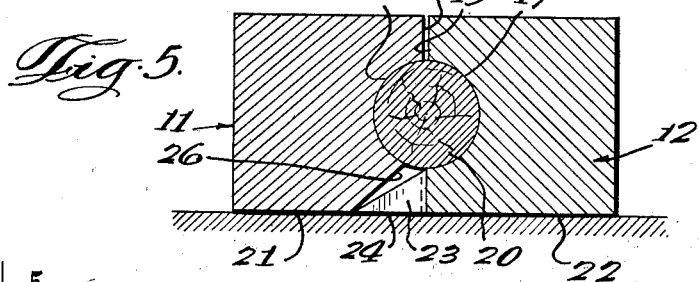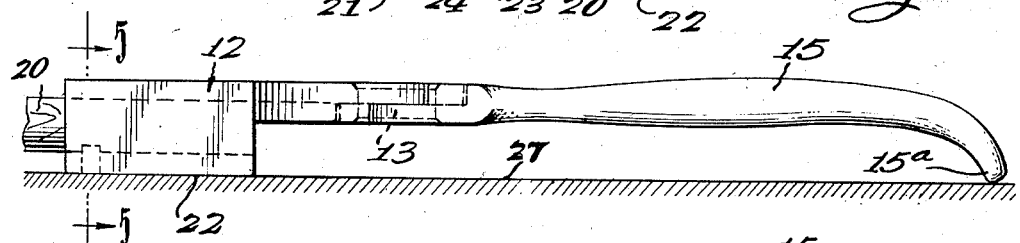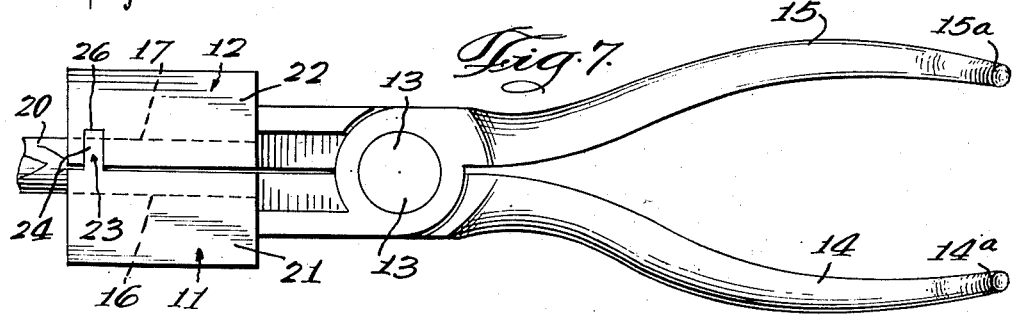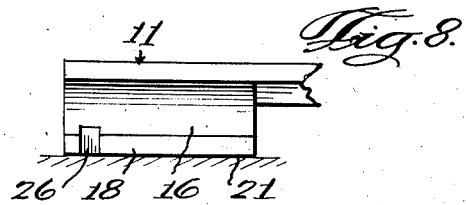

United States Patent Office 2,814,963
Patented Dec. 3, 1957

2,814,963

ARTICLE GRIPPING TOOL

Bertie S. Harrington, Chicago, Ill., assignor to Armour and Company, Chicago, Ill., a corporation of Illinois Application December 22, 1955, Serial No. 554,764

1 Claim. (Cl. 81—5.1)

This invention relates to a gripping tool, and more particularly to a device for selectively removing articles of cylindrical shape from a flat surface.

In the several arts involving the construction or fabrication of materials and articles in which is inserted or implanted a fastener, handle, support or other device of relatively cylindrical shape, it is conventional practice to spread several of such devices on a flat surface, such as a table, slab or stand. Then one of the cylindrical devices may be grasped between the fingers of an operator to be manually affixed to the material or article.

For example, in the meat packing art, a product termed "mock chicken leg" is customarily prepared by molding a mixture of subdivided meats, e. g. hashed pork and veal, into a general ellipsoid shape. Then the elliptically-shaped meat product is perforated at one end to obtain a longitudinal hole therein of relatively cylindrical shape. A wooden skewer is received into such longitudinal hole to serve, principally, as a handle for the mock chicken leg. In current practice the molding of the subdivided meats into ellipsoid shape, and the boring of a hole in the end of the meat product, is accomplished by an apparatus which molds the product and produces the perforation therein in a mechanical operation. The insertion of the wooden skewer is obtained by a manual operation in which the operator selects a skewer from a table and introduces it, by hand, into the hole provided in the end of the molded meat product.

The selective withdrawal from a flat surface of skewers, or such other articles of cylindrical shape as pins, pegs, rivets, nails, dowels and bolts, cannot be obtained with facility by the human hand. Thus, in removing such articles from a tabletop a great deal of dexterity is required, and the operation is tedious and laborious.

Accordingly, it is an object of this invention to provide a tool for gripping articles of cylindrical shape to effect their removal from a flat surface and to support them in level position. Other objects and advantages will become apparent as the specification proceeds.

The embodiment of this invention shown in the accompanying drawing is a special gripping tool of the pliers type, and in these drawings Fig. 1 is a perspective side showing the gripping tool in closed position; Fig. 2 is a view similar to that of Fig. 1 in which the gripping tool is portrayed in open position; Fig. 3 is a bottom perspective view showing the gripping tool in open position. Fig. 4 is a sectional view showing the companion jaws of the gripping tool in open position; Fig. 5 is a sectional view similar to that of Fig. 4 taken on line 5—5 of Fig. 6 and in which the gripping tool is portrayed in closed position; Fig. 6 is a side elevational view showing the gripping tool in closed position; Fig. 7 is a bottom view showing the gripping tool in closed position; and Fig. 8 is a sectional view taken on line 8—8 of Fig. 4 and showing opposed face 18 of jaw 11.

The gripping tool shown includes companion jaws 11 and 12 pivotally connected by rivet 13 to opposed handle grips 14 and 15.

These companion jaws contain longitudinal hemicylindrical grooves 16 and 17 in their opposed faces 18 and 19. These grooves are adapted to receive, grip and position an article of cylindrical shape 20. Thus, grooves 16 and 17 are such that, when opposed faces 18 and 19 of companion jaws 11 and 12 are moved into contact, the cylindrical article is rigidly supported in the hollow cylinder formed by the contact between such hemicylindrical grooves (see Figs. 1 and 5).

Opposed handle grips 14 and 15 are formed with curved tips 14a and 15a such that plane surfaces 21 and 22 of jaws 11 and 12 can be received on flat surface 27, e. g. tabletop, in level position (see Figs. 6 and 7).

Opposed face 19 of jaw 12 is provided with projection 23 which extends in the direction of opposed face 18 of jaw 11. This projection has a bottom edge 24 which is a continuation of plane surface 22 of jaw 12, i. e., this bottom edge forms a plane with plane surface 22. The projection is also provided with angular edge 25 which extends downwardly from the arc of hemicylindrical groove 17 to form an acute angle with bottom edge 24 (see Figs. 2 to 5).

Opposed face 18 of jaw 11 is provided with milled slot 26 into which projection 23 is recessed when opposed faces 18 and 19 are contacted in the closed position of jaws 11 and 12. This slot may be formed of parallel sides corresponding to the sides of projection 23, and an angular back surface corresponding to angular edge 25 of such projection 23.

Although this gripping tool can be employed in the removal of any article of cylindrical shape from a flat surface, its operation can be described, generally, in connection with the selective withdrawal of wooden skewers from a tabletop for insertion into the longitudinal perforation of a mock chicken leg. These wooden skewers are usually of cylindrical shape tapering to a point at one end, and such skewers are represented in Figs. 1 and 2 by rod 20 (partly shown).

These wooden skewers may be randomly distributed on a tabletop to furnish a supply thereof for the operator, although the operation can be more effectively accomplished by arranging the skewers in rows with the tapering ends thereof facing away from the operator. The gripping tool is rested on the tabletop (flat surface 27 in Fig. 6), and plane surfaces 21 and 22 of jaws 11 and 12, in relation to curved tips 14a and 15a of the handle grips, should be in level position. The operator can place the thumb and forefinger on the outside edges of the respective handle grips, while the index finger is introduced between the handle grips to provide leverage.

The gripping tool is moved on flat surface 27 so that the open jaws 11 and 12 come to rest with skewer 20 being disposed between opposed faces 18 and 19 (see Figs. 2 and 4). Opposed faces 18 and 19 of jaws 11 and 12 are then brought into contact by squeezing the handle grips together. As such opposed faces are moved into contact, skewer 20 is engaged by angular edge 25 of projection 23. Simultaneously, skewer 20 is brought into contact with opposed face 18 whereby skewer 20 is forced up the incline formed by angular edge 25 into hemicylindrical grooves 16 and 17 of opposed faces 18 and 19. When the opposed faces 18 and 19 are brought into complete contact projection 23 is recessed in slot 26 so that skewer 20 is supported in the hollow cylinder formed by hemicylindrical grooves 16 and 17 (see Figs. 1, 5, 6 and 7).

The gripping tool can be maintained in closed position by exerting a slight pressure on the handle grips. Thereupon the gripping tool can be lifted from the tabletop and the tapered end of skewer 20 brought into contact with the longitudinal perforation of the mock chicken leg (not shown). The movement of the gripping tool towards the end of the mock chicken leg forces the tapered end of skewer 20 into such perforation. Thereafter, the jaws 11 and 12 of the gripping tool can be opened by applying opposing pressure to the handle grips to force them apart (see Figs. 2 and 4). In the open position the gripping tool can be withdrawn from skewer 20 and replaced on flat surface 27. The foregoing operation can be repeated to pick up another skewer for insertion into another mock chicken leg.

This gripping tool, although shown in connection with a manual operation, can be adapted to a mechanical system in which the opening and closing of jaws 11 and 12 is accomplished by mechanical means. Also, a series of these gripping tools can be adapted to selectively withdraw articles of cylindrical shape supplied by an endless belt to be inserted or implanted in any material or contrivance in a manufacturing operation. The articles of cylindrical shape utilized in connection with this gripping tool can be pegs, dowels, nails, bolts, screws, rivets, pins, etc.

This gripping tool can be employed in conjunction with fastening devices, such as riveting equipment, wrenches, screwdrivers, hammers, etc. It will be understood that such devices and this special gripping tool, can be constructed of metal, wood or other suitable material.

While in the foregoing specification various embodiments of this invention have been shown and specific details thereof elaborated for the purpose of illustration, it will be apparent to those skilled in the art that this invention is susceptible to other embodiments and that many of these details can be varied widely without departing from the basic concept and spirit of the invention.

I claim:

A gripping tool for selectively removing an article of cylindrical shape from a flat surface and for rigidly supporting such article of cylindrical shape in a level position, comprising companion jaws having longitudinally extending hemicylindrical grooves in the opposed faces thereof extending to the end of said jaws and adapted to receive an article of cylindrical shape when said opposing faces are moved into contact, said jaws having at least one plane surface disposed at a right angle to the opposed faces thereof adapted to be received in level position on a flat surface, at least one of said jaws having a projection on the opposed face thereof extending in the direction of the opposed face of the other of said jaws, said projection having an edge forming a continuous plane with the plane surface of said jaws and having another edge depending from an arc of the hemicylindrical groove of said opposed face and providing an acute angle with such first-mentioned edge, and the other of said jaws having a depression in the opposed face thereof for recessing said projection when said opposed faces are brought into contact, and means for moving said opposed faces into contact.

References Cited in the file of this patent
UNITED STATES PATENTS

| | | |
|---|---|---|
| 1,501,816 | Seppmann | July 15, 1924 |
| 1,661,365 | Gendron | Mar. 6, 1928 |
| 2,586,756 | Wolfe et al. | Feb. 19, 1952 |